Nov. 2, 1954  E. A. STALKER  2,693,324
STABILIZING MECHANISM FOR ROTARY WING AIRCRAFT
Original Filed Oct. 18, 1946
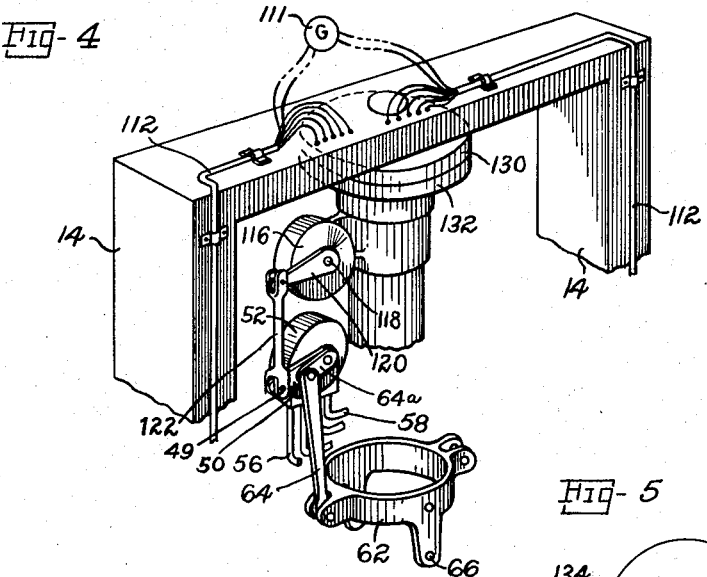
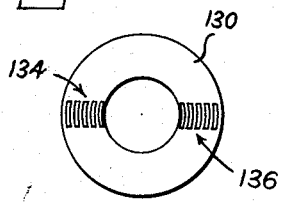
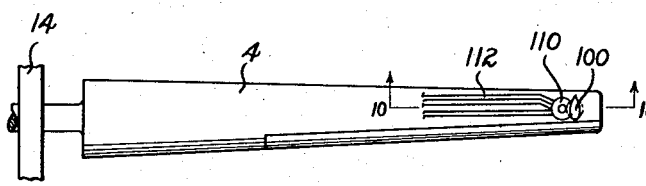
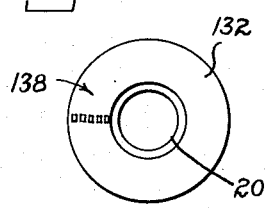
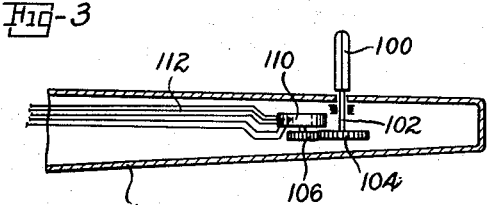
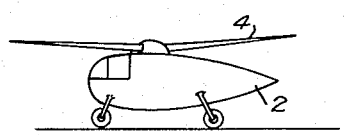
INVENTOR.
Edward A. Stalker
BY
Marechal Biebel French & Bugg
ATTORNEYS

United States Patent Office 2,693,324
Patented Nov. 2, 1954

2,693,324

STABILIZING MECHANISM FOR ROTARY WING AIRCRAFT

Edward A. Stalker, Bay City, Mich.

Original application October 18, 1946, Serial No. 704,167, now Patent No. 2,624,531, dated January 6, 1953. Divided and this application March 8, 1952, Serial No. 275,478

3 Claims. (Cl. 244—17.13)

This invention relates to aircraft and particularly to the control of aircraft of the direct lift type.

An object of the invention is to provide means for stabilizing or balancing aircraft of the direct lift type.

Another object is to provide means particularly adapted to stabilize direct lift aircraft.

Another object is to provide means for stabilizing aircraft, said means functioning in response to a property of the relative wind, such as its pressure or direction.

Still another object is to provide means of stabilizing aircraft which means are free from the accumulation of errors from their operation.

Other objects will appear from the description, claims and drawings.

The above objects are accomplished by the means illustrated in the accompanying drawings in which—

Fig. 1 is a side elevation of an aircraft to which the control of the present invention is applicable;

Fig. 2 is a fragmentary top view of a blade and the clevis;

Fig. 3 is a fragmentary section taken along line 2—2 in Fig. 2;

Fig. 4 is a fragmentary view in perspective of the vane electrical means for governing the blade lift variation;

Fig. 5 is a view from the bottom of one of the electrical contact plates; and

Fig. 6 is a view from above of another of the electrical contact plates.

This application is a division of application Serial No. 704,167, filed October 18, 1946, now Patent No. 2,624,531, which includes a theoretical analysis of the invention.

While this invention is useful in other types of aircraft, it is particularly useful for helicopters and accordingly will be described with reference to such type. A helicopter has no inherent stability in hovering and tends to continue a tilting disturbance. In forward flight some stability may be obtained from tail planes and the like but the machine still remains laterally unstable. This application describes controls which stabilize the aircraft laterally but which are also applicable to stabilize the machine longitudinally if desired.

The primary requirement for a satisfactory lateral control device is that it has as its activator an instrument which is sensitive enough to respond to a relatively slight lateral drift of the helicopter.

In the form of the invention shown in the drawing, the direction of the relative wind is used to actuate the mechanism for controlling the lifts of the blades. Vanes 100 extend into the relative wind substantially normal to the blades 4 and are pivoted preferably near the tips of the blade and are suitably weighted internally to be free from mass acceleration forces, the pivot of the vane being sufficiently close to the leading edges to normally maintain the vane in a neutral position. Although the vanes are preferably mounted on the blade tips, they may also be mounted upon some other element rotating in coordination with the blades. When the blades extend laterally the vanes should be substantially parallel to the chord direction of the blade or at least they should have a definite relation to this line.

If the aircraft is side slipping the vanes will be turned from their neutral or basic position. The vane is fixed to shaft 102 which has fixed to it the gear 104 which meshes with the smaller gear 106 fixed to the shaft of the self-synchronous master motor 110 supplied with power from power source 111 shown as a single phase source of power and suitably connected to each of cables 112. As shown, gear 104 is preferably larger than gear 106 so that movement of the latter and thus of motor 110 will be suitably magnified, to provide greater accuracy of control. This motor 110 is electrically connected through the cable 112 with the follower motor 116 (Fig. 4). Its shaft 118 is connected by arm 120 and link 122 to the arm 50 of valve 52. The remainder of the valve and cam structure is similar to that disclosed in said Patent No. 2,624,531.

The electric current is conducted from the moving blades to the follower motor 116 by means of the circular plates 130 and 132, the former fixed to and rotatable with the clevis 14 and the latter secured to the post 20. The plate 130 has two sets 134 and 136 of contactors of five each, one set for each vane connected through cables 112 respectively with the vanes. However, current only flows from the source 111 through one set at a time. This is assured by providing only one set of contactors 138 in the plate 132. Hence, as the blades and the contactors on plate 130 rotate, first one set 134 and then the other 136 registers with the set of contactors 138 on plate 132. By this arrangement only one blade, when it is in the retreating position, for instance, transmits a control potential to the follower motor 116 in accordance with the direction of the relative wind as determined by the vane 100. This control potential is translated into variation of the blade lift so as to eliminate the sideslip causing the deviation of the relative wind. The control sensitive to side slip could be derived from the advancing blade but the retreating blade will have a greater rotation of its vane for a given sideslip velocity because its chordwise relative wind velocity is less and for that reason is preferred for the purposes of this invention. A blade is referred to as being in the advancing position or being the advancing blade when it has a forward component of velocity relative to the fuselage and as being in the retreating position or as the retreating blade when it has a rearward component of the velocity relative to the fuselage.

It will now be clear that a novel and useful means of stabilizing helicopters has been disclosed, making it unnecessary for the pilot to be continuously on the alert to correct any tendency of the helicopter to roll over as has been the case heretofore, and providing a reliable and successful means of correcting the well-known inherent tendency for helicopters to tilt and roll over. While gyroscopes have been employed to govern the control of helicopters so as to stabilize them with respect to the plane of rotation of the gyroscope, the gyroscope tends to drift from its original plane due to friction of its mounting and to various other disturbing factors. In flight conditions where inclement weather obscures the horizon, the pilot has no way to known whether the gyroscope is still in proper relation to the horizon, yet it is most important at this time for him to be capable of establishing accurately the attitude of the aircraft.

The present invention depends only on a tendency to sideslip which must always occur under the action of gravity if the aircraft is tilted. The presence of a sideslip will bring about correcting changes in the lifting rotor as described to eliminate the side slip.

Since the correcting action depends on a sideslip under the action of gravity which has a constant direction of action, the aircraft always has a safe and reliable reference for detecting any tilting of the machine.

In the laterally extending orbital position of the blade, a vane pivotally carried on the blade should be parallel to the chord line of the blade if the machine is not sideslipping or tilting. Deviation of the vane from the chord-line, which can be regarded as a base or reference line, indicates sideslipping, and the deviation is employed to institute lift changes on the rotor blades to bring about the stabilization of the helicopter.

It will be recognized that the devices described are independent of visibility of the the horizon and yet they do not require checking with the horizon since the action of these devices depends on the line of action of gravity which is invariant. This invention therefore represents a substantial advance in safety and ease of operation of direct lift aircraft.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in a direct lift aircraft, an aircraft body, a rotor hub mounted on said body and rotatable about a generally vertical axis, a pair of opposed blades mounted on said hub, means for varying the lift of each of said blades, a detector element mounted on each of said blades, each of said elements being spaced from said axis and displaceable in response to relative wind components spanwise of the blade, mechanism interconnecting said lift varying means and said detector elements for actuating said lift varying means in response to displacements of said detector elements, said mechanism including a control device actuated by rotation of said hub and arranged to render said detector elements effective when either of said blades occupies a predetermined orbital position with respect to said body and to render said elements ineffective for all other orbital blade positions.

2. In combination in a direct lift aircraft, an aircraft body, a rotor hub mounted on said body and rotatable about a generally vertical axis, a blade mounted on said hub, means for varying the lift of said blade, a detector element mounted on said blade, said detector element being spaced from said axis and displaceable in response to relative wind components spanwise of the blade, mechanism interconnecting said lift varying means and said detector element for actuating said lift varying means in response to displacement of said detector element, said mechanism including a control device actuated by rotation of said hub and arranged to render said detector element effective when said blade is in a predetermined retreating position with respect to said body and to render said elements ineffective for all other orbital blade positions.

3. In combination in a direct lift aircraft, an aircraft body, a rotor hub mounted on said body and rotatable about a generally vertical axis, a blade mounted on said hub, means for varying the lift of said blade, a detector element movably mounted on said blade, said detector element being spaced from said axis and movable in response to relative wind components spanwise of the blade, mechanism interconnecting said lift varying means and said detector element for actuating said lift varying means in response to displacements of said detector elements, said mechanism including a control device actuated by rotation of said hub and arranged to render said detector element effective when said blade occupies a predetermined orbital position with respect to said body and to render said element ineffective for all other orbital blade positions.

References Cited in the file of this patent

UNITED STATES PATENTS

| Number | Name | Date |
|---|---|---|
| 1,800,470 | Oehmichen | Apr. 14, 1931 |
| 1,818,238 | Mellander | Aug. 11, 1931 |
| 1,889,273 | Avery | Nov. 29, 1932 |